United States Patent Office 3,152,087
Patented Oct. 6, 1964

3,152,087
ALKALI METAL SUBSTITUTED BENZENE ALKYL-ATE AND TiCl POLYMERIZATION CATALYST
Gordon D. Brindell and Alexander Shadan, Ponca City, Okla., assignors to Continental Oil Company, Ponca City, Okla., a corporation of Delaware
No Drawing. Filed Sept. 23, 1959, Ser. No. 841,691
4 Claims. (Cl. 252—429)

This invention relates to an improved polymerization catalyst and process employing said catalyst. In one aspect it relates to a polymerization catalyst prepared from the reaction product obtained by the alkylation of benzene with low molecular weight olefin polymer.

The lower alkyl sodium compounds are known in the art to be active for the polymerization of ethylenically unsaturated monomers. In view of their high basicity, these materials are very active and are preferred as catalyst components. Attempts have been made to utilize certain aryl and alkaryl alkali metal compounds such as phenyl sodium, para-tertiary butyl phenyl sodium for polymerizing olefinic materials, however these compounds are less basic than the lower alkyl alkali metal compounds and do not provide desirable polymerization catalysts.

It is an object of this invention to provide improved polymerization catalyst and process utilizing said catalyst.

Another object of this invention is to provide improved organo alkali metal polymerization catalyst and process for polymerizing ethylenically unsaturated monomers with said catalyst.

These and other objects of the invention become more readily apparent from the following detailed description and discussion.

The foregoing objects are realized broadly by providing a polymerization catalyst comprising a transition metal halide and the product obtained from the alkylation of benzene with low molecular weight olefin polymer, said product having an average molecular weight between about 150 and about 400 and the benzene ring of said product being substituted with an alkali metal.

The organic component of the catalyst comprises mono- and dialkyl benzene hydrocarbons obtained by the reaction of benzene with an alkylating agent in the presence of a Friedel-Crafts type catalyst, such as boron fluoride, aluminum chloride, hydrogen fluoride, sulfuric acid, etc. The alkylating agent is a branched chain olefin such as polymers of propylene including trimers, tetramers, pentamers or mixtures thereof. The preferred organic component is the reaction product of dodecene (propylene tetramer) with benzene. The product of this reaction comprises an admixture of mono- and dialkyl benzenes containing from 10 to as high as 36 carbon atoms and having a boiling range (ASTM) varying from about 350 to about 800° F. This reaction product is ordinarily separated into various fractions by distillation. These fractions are sold commercially under various trade names. The lowest boiling fraction of the reaction product which is known as "dodecylbenzene intermediate" has a boiling range in the order of 350 to 450° F., a specific gravity of about 0.815 and a molecular weight of about 160. The next fraction which is customarily designated as "dodecylbenzene" boils in the range of 530 to 600° F., has a specific gravity of about 0.875 and a molecular weight of about 237. The next fraction which is called "postdodecylbenzene overhead" boils from about 600 to about 685° F., has a specific gravity of about 0.865 and a molecular weight of about 300. The final and highest boiling fraction which is designated as "stripped postdodecylbenzene" has a boiling range of about 630 to 770, a specific gravity of about 0.865 and a molecular weight of about 385. More detailed properties of each of these fractions are presented in Table I.

TABLE I

| | Dodecylbenzene Intermediate (Conoco H-160)* | Dodecylbenzene (Neolene 400)* | Postdodecylbenzene Overhead (Conoco H-300)* | Stripped Postdodecylbenzene (Conoco H-385)* |
|---|---|---|---|---|
| Distillation Range (° F.): | | | | |
| I.B.P. | 344* | 535 | 604 | 630. |
| 1% | 346 | | 613 | 668. |
| 5% | 351 | 545 | 622 | 690. |
| 10% | 354 | 550 | 625 | 698. |
| 50% | 371 | 560 | 644 | 726. |
| 90% | 410 | 580 | 666 | 763. |
| 95% | 425 | | 682 | 770. |
| 97% | 436 | 592 | 675 | |
| F.B.P. | 444 | 603 | 684 | 770. |
| Percent Rec. | 98 | 99 | 97 | 95. |
| Specific Gravity | 0.8146 (60° F.) | 0.875 (60° F.) | 0.8660 (100° F.) | 0.8639 (100° F.). |
| Molecular Weight [3] | 160 | 237 | 300 | 385. |
| Aniline Point (° F.) [4] | 95 | 48.5 | | |
| Bromine No. [5] | 0.27 | 0.12 | 0.40 | 0.44. |
| Saybolt Color [6] | 29 | 29 | 1¾ [1] | 11.[2] |
| Refractive Index at 25° C | 1.4550 | 1.4885 | | |
| Percent Aromatics [7] | 63 | | | |
| Appearance | Clear and water white | Clear and water white | | |
| Flash Point (closed cup), ° F.[8] | 129.5 | 260 | 335 | 375. |
| Viscosity: | | | | |
| Centipoises at 68° F | 5 | 14 | 19.9 (100° F.) | 84.2 (100° F.). |
| Centipoises at 32° F | 6 | 37 | | |

*Trademarks of Continental Oil Company.
[1] ASTM D-155-45T—NPA Color.
[2] ASTM D-154—Gardner Color.
[3] Cryoscopic method using benzene.
[4] ASTM D611.
[5] ASTM D1159.
[6] ASTM D156.
[7] ASTM D-1019-51.
[8] ASTM D-56.

Each of the above fractions or portions or admixtures thereof can be employed as the organic component of the catalyst of this invention. The preferred fraction for this purpose is the dodecylbenzene intermediate fraction.

It is within the scope of the invention to employ as the metal halide component of the catalyst any of the transition metal halides which are known in the art to be active in the polymerization of ethylenically unsaturated polymerizable monomers. For example, generally the chlorides, bromides, etc., of the metals of Groups III, IV, V, VI, VII and VIII of the periodic table can be used. The halides of the metals of Groups IV–A, V–A and VI–A are especially active in polymerization, particularly the halides of titanium, zirconium, vanadium, chromium and molybdenum. A particularly desirable catalyst and the one preferred in the catalyst composition of this invention is titanium tetrachloride.

The catalyst of this invention can be employed generally in the conversion of polymerizable ethylenically unsaturated monomers. These monomers include materials which are well known in the art to be polymerizable in the presence of organometal containing catalyst, including aromatic and aliphatic mono 1-olefins, diene monomers, etc., and admixtures of various polymerizable monomers. Preferably the catalyst is employed in the polymerization of polymerizable aliphatic 1-olefins, particularly 1-olefins containing up to 8 carbon atoms and more particularly low molecular weight olefins such as ethylene, propylene, etc. The polymerization reaction conditions, for example, temperature, pressure, time, etc., employed in the polymerization reaction vary widely depending on the particular monomers used and on the composition of the polymerization catalyst. In general the reaction conditions correspond to those which are well known in the art and can be varied as required for the particular polymerization system. For convenience low temperatures from room temperature up to 100° C. are ordinarily employed, however more elevated temperatures up to as high as 200° C. can be used if desired. The reaction pressure is not critical and usually is determined only by the limitations of the equipment employed. The reaction time can also vary widely and is established primarily by the degree of conversion desired.

Generally the polymerization reaction is carried out in the presence of a liquid diluent which serves as a carrier for the catalyst, as a heat sink for a polymerization temperature control and as a diluent and sometimes partial solvent for the polymer product. The diluent which is usually a hydrocarbon can be any material ordinarily employed in polymerizaiton catalyst systems comprising an organometal compound and a transition metal halide. Specific diluents are the paraffins such as butane, pentane, hexane, heptane, etc., cycloparaffin such as cyclohexane, cyclopentane, methyl cyclopentane and the like. Usually the diluent is selected from compounds containing from about 6 to about 12 carbon atoms.

In the preparation of the catalyst substitution of the alkali metal in the benzene ring is accomplished by first halogenating the nucleus with a halogen and then reacting with an alkali metal whereby the halogen is displaced. Various halogens, preferably chlorine, can be utilized in the first step of the reaction. In one method, chlorine gas is reacted with the benzene ring in the absence of light and in the presence of an iron catalyst, the reaction being carried out initially at room temperature. The chlorinated reaction product is further reacted with the alkali metal, such as sodium in dispersion, to replace the halogen and provide alkylation product having sodium substituted in the benzene ring. While any of the alkali metals can be employed in the catalyst of this invention, sodium is preferred, followed by potassium.

Various methods of combining the transition metal halide and alkaryl alkali metal catalyst components can be employed, however, generally the catalyst is prepared by suspending or dissolving one of the components in the hydrocarbon diluent, such as previously described and thereafter adding the other component to the admixture. The ratio of catalyst components in the catalyst system can be varied substantially, however, usually it is preferred to provide the organometal component in an amount sufficient to provide a molar ratio of this component to metal halide of about 0.5:1 or higher, up to as high as 10:1.

A preferred catalyst for use in the invention comprises sodium dodecylbenzene intermediate and titanium tetrachloride. Other catalysts include alkali metal derivatives of the various fractions of the alkylation product of benzene and dodecene with titanium tetrachloride, zirconium tetrachloride and other metal halides.

The polymers which are prepared from the catalyst of this invention are usually solid polymers and find application in the various fields and uses where olefin polymers are normally employed.

The following examples are presented in illustration of the invention:

Example 1

CATALYST PREPARATION

A 300 g. charge of DBI containing approximately 1 mole of aromatics and 3.5 g. of 40 mesh degreased iron filings was placed in a 1-liter 3-necked flask fitted with a stirrer, thermometer, reflex condenser and inlet for gas. The flask had been sprayed with black paint to exclude light. The stirrer was started and chlorine was passed in at room temperature at the rate of 24 g./hr. Hydrogen chloride was evolved during the reaction and was absorbed in water. The temperature rose spontaneously to 47° C. over the first ¾ hour and thereafter remained constant. After 3 hours of chlorine passage, the contents of the flask had gained 42 g. The product which was a dark colored liquid was transferred into a separatory funnel and washed twice with dilute HCl (1:1) and twice with water and then dried over $CaCl_2$. Vacuum distillation was carried out at 20 mm. Hg pressure and gave the following cuts:

|  | ° C. | G. |
|---|---|---|
| Cut 1 | 55–100 | 112 |
| Cut 2 | 100–143 | 150 |
| Cut 3 | 143–170 | 58 |
| Bottoms |  | 8 |
| Loss and Holdup |  | 14 |

Chlorine analysis on cut 3 found 18.45% Cl. Calculated values for monochlorinated alkylbenzenes are:

|  | Cl, percent |
|---|---|
| Chloro-tert-butylbenzene | 21.6 |
| Chloro-tert-amylbenzene | 19.2 |
| Chloro-tert-hexylbenzene | 17.9 |

A sodium dispersion was prepared in 250 ml. of Ponca City Heavy Alkylate [1] using 12 g. (0.52 g. atom) of metal. The dispersion was prepared in a 500 ml. 3-necked flask equipped with a high-speed stirring assembly, addition funnel with a pressure equalizer and means for maintaining a nitrogen atmosphere. When the dispersion had been prepared, the heavy alkylate was drawn off and replaced by 270 ml. of dry n-hexane. Approximately 10 ml. of the chloride of cut 3 from the aforedescribed vacuum distillation was added with high-speed stirring. The reaction was initiated after being warmed to 50° C. and after addition of a few drops of n-amyl alcohol. The remainder of the chloride was added between 32 and 38° C. and then post stirred for one hour. Differential titration of the organosodium product gave the following results:

|  | Meq./ml. |
|---|---|
| Total alkalinity | 0.677 |
| Free Na | 0.344 |
| Organosodium | 0.333 |

The yield of organosodium based on sodium was 41%.

0.01 mole of titanium tetrachloride was dissolved in normal hexane and added to 0.108 mole of the organosodium product with shaking at Dry Ice temperature. The resulting catalyst slurry and two liters of dry normal hex- ---
[1] Bottoms from distillation of alkylation product of butylene and isobutane.

ane were charged to a one-gallon Hastelloy B autoclave, and ethylene was pressured to the autoclave, slowly building up to 400 p.s.i.g. in one hour. This pressure was maintained with stirring for three hours and the reaction temperature was held near 25° C. Following this, the contents of the autoclave were discharged into methyl alcohol and the polyethylene filtered and dried in a vacuum oven. The weight of dry polymer was 860 grams.

*Example 2*

A second run was carried out utilizing the same equipment, reaction conditions, catalyst and catalyst quantities as in Example 1. The weight of polyethylene in this experiment was 1000 grams.

*Example 3*

Experiments carried out under conditions similar to Examples 1 and 2 utilizing as the catalyst amyl sodium, decylsodium or para-sodio-tertiary butylbenzene with titanium tetrachloride result in a yield of about 400 to 500 grams of polyethylene; phenyl sodium with titanium tetrachloride less than 50 grams of polyethylene; and aluminum triisobutyl with titanium tetrachloride about 100 grams of polyethylene.

*Example 4*

An organosodium derivative was prepared from aliphatically chlorinated dodecylbenzene intermediate and sodium dispersion. A catalyst was prepared from 0.1 mole of the aliphatically substituted organosodium compound and 0.01 mole of titanium tetrachloride. Two liters of dry normal hexane were used as the polymerization medium. A run was carried out under the same conditions as those set forth in Example 1. No polymer was formed, indicating an inactive catalyst.

We claim:
1. A catalyst composition comprising titanium tetrachloride and reaction product obtained from the alkylation of benzene with low molecular weight olefin polymer comprising aliphatic 1-olefin, said reaction product having an average molecular weight between about 150 and about 400, the benzene ring of said reaction product being substituted with an alkali metal.
2. The composition of claim 1 wherein said low molecular weight olefin polymer comprises dodecene.
3. The composition of claim 1 wherein the alkali metal is sodium.
4. The composition of claim 1 wherein the molar ratio of reaction product to titanium tetrachloride is in the range of 0.5:1 to 10:1.

References Cited in the file of this patent
UNITED STATES PATENTS

| | | |
|---|---|---|
| 2,879,263 | Anderson et al. | Mar. 24, 1959 |
| 2,886,560 | Weber | May 12, 1959 |
| 2,905,645 | Anderson et al. | Sept. 22, 1959 |
| 2,925,392 | Seelbach et al. | Feb. 16, 1960 |
| 3,007,907 | Robinson et al. | Nov. 7, 1961 |

FOREIGN PATENTS

| | | |
|---|---|---|
| 218,210 | Australia | Nov. 3, 1958 |